(12) United States Patent
Endo et al.

(10) Patent No.: US 6,412,591 B1
(45) Date of Patent: *Jul. 2, 2002

(54) ELECTRIC POWER STEERING APPARATUS

(75) Inventors: Shuji Endo; Kenichi Hayakawa, both of Maebashi (JP)

(73) Assignee: NSK Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/448,503

(22) Filed: Nov. 24, 1999

(30) Foreign Application Priority Data

Nov. 26, 1998 (JP) .............................. 10-335218

(51) Int. Cl.⁷ ................................................ B62D 5/06
(52) U.S. Cl. .......................... 180/427; 180/428; 74/422
(58) Field of Search ................................ 180/427, 428, 180/443, 444, 446; 74/422, 498

(56) References Cited

U.S. PATENT DOCUMENTS

| | | | | |
|---|---|---|---|---|
| 4,724,717 A | * | 2/1988 | Chikuma .................. 74/422 X |
| 4,890,683 A | * | 1/1990 | Matsuda et al ............. 180/444 |
| 5,058,448 A | * | 10/1991 | Kiyooka et al. ............... 74/422 |
| 5,454,438 A | * | 10/1995 | Chikuma ................ 180/443 X |
| 5,906,250 A | * | 5/1999 | Haga et al. .................. 180/444 |
| 5,983,742 A | * | 11/1999 | Morris et al. .................. 74/422 |
| 6,044,723 A | * | 4/2000 | Eda et al. ............... 180/443 X |
| 6,123,481 A | * | 9/2000 | Oka et al. .................... 403/228 |
| 6,155,377 A | * | 12/2000 | Tokunaga et al. ........... 180/446 |

FOREIGN PATENT DOCUMENTS

JP  7-25311  3/1995 ............ B62D/5/04

\* cited by examiner

*Primary Examiner*—Kenneth R. Rice
*Assistant Examiner*—Christopher Buchanan
(74) *Attorney, Agent, or Firm*—Sughrue Mion, PLLC (57) ABSTRACT

An electric power steering apparatus having a rack and pinion movement converting mechanism for converting rotation movement of a steering wheel into linear movement by engagement between a pinion shaft and a rack shaft. A motor for assisting a driver's steering force asserted on the steering wheel is provided along with the rack and pinion movement converting mechanism and, an elastic body is inserted in a mechanism passage from the pinion shaft to an output shaft of the motor to produce system with low load exerted on the steering mechanism and with reduced rattle and reduced influence from frictional force of a power assisting motor.

11 Claims, 8 Drawing Sheets

ELECTRIC POWER STEERING APPARATUS

BACKGROUND OF THE INVENTION

1. Field of the Invention

The present invention relates to an improvement in performance of an electric power steering apparatus for assisting a force required for a steering operation of a vehicle with the aid of a rotating force of an electric motor.

2. Description of the Related Art

As a power steering apparatus of a vehicle used for assisting a steering force, an electric power steering apparatus constructed so as to assist a driver's steering force to a steering wheel by using a rotating force of an electric motor (hereinafter referred to as a "motor") is known.

As an example of this kind of electric power steering apparatus, a power steering apparatus adopting a rack and pinion movement converting mechanism for converting movement into linear movement is disclosed in Japanese Patent Publication (KOUKOKU) No. Hei.7-25311.

Figure 1:
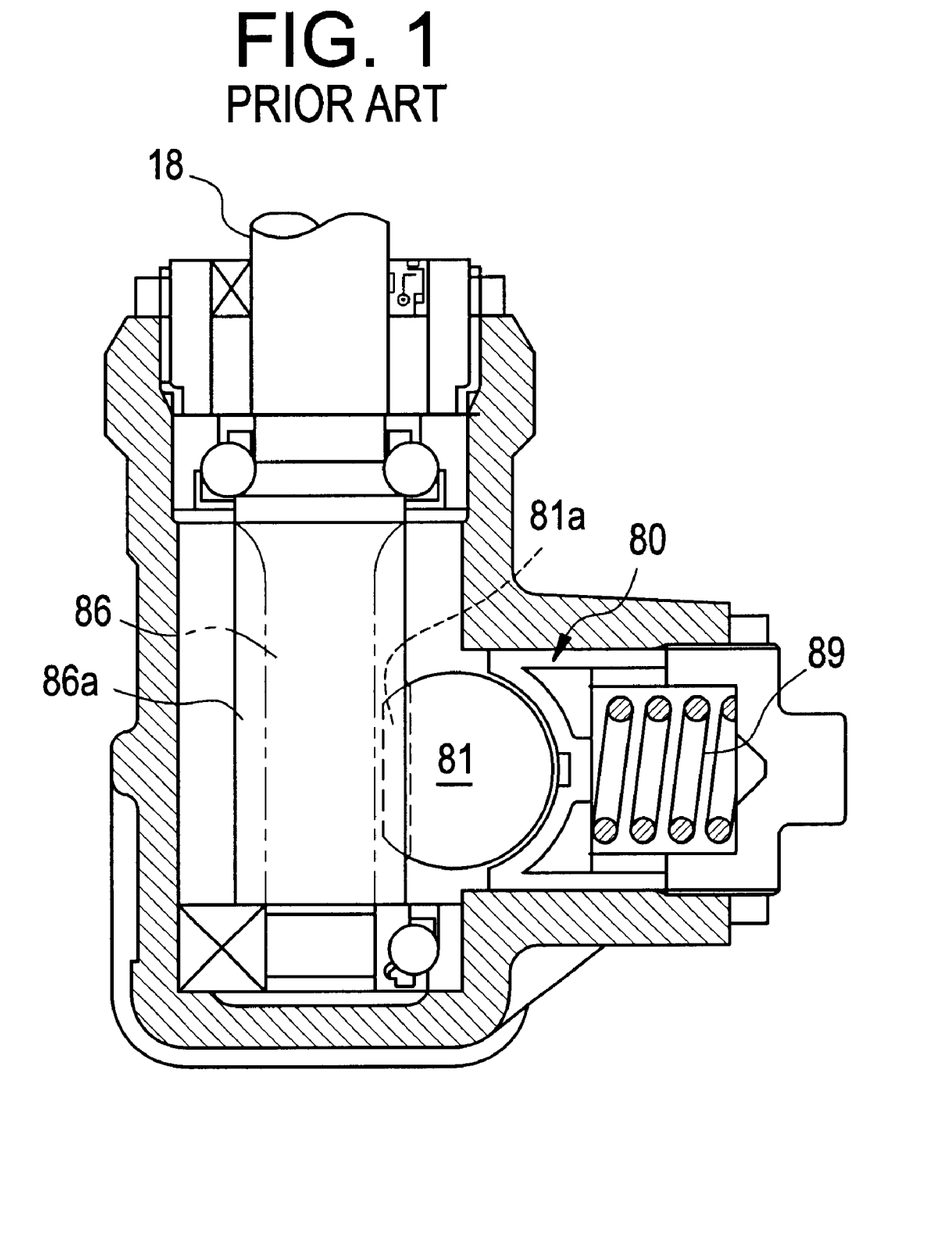
FIG. 1 is a sectional view showing a rack and pinion movement converting mechanism of a conventional electric power steering apparatus.

FIG. 1 is an enlarged sectional view showing a conventional rack and pinion movement converting mechanism. In this mechanism, pinion teeth 86a are formed on an outer peripheral surface of an end portion of a pinion shaft 86. A flat portion is formed in the vicinity of one end of a rack shaft 81 in an axial length direction, and rack teeth 81a are formed over the whole length of the flat portion. The pinion teeth 86a and the rack teeth 81a are engaged with one another so that rotation movement is converted into linear movement. Contrivance of keeping a steering force constant in spite of an electric motor with a relatively low rotating output is made in such a manner that the rack teeth 81a are engraved such that a gear ratio to the pinion teeth 86a becomes small at a position where a vehicle moves straight, and the gear ratio becomes large at a position where a steering angle is large.

In the above rack and pinion movement converting mechanism, the rack shaft 81 is pressed by an energizing force of a coil spring 89 abutting on one end of a pressing member 80 in an almost cylindrical member, so that engagement between the rack teeth 81a and the pinion teeth 86a is kept. By this engagement, rotation of the pinion shaft 86 is converted into linear movement of the rack shaft 81 in the axial length direction, and the pressing member 81 slides on the outer peripheral surface of the rack shaft 81. Thus, in this structure, abrasion of the sliding surface is remarkable, so that the pressing force (energizing force) of the coil spring 89 is limited. Thus, the electric power steering apparatus, such as a pinion assist type electric power steering apparatus in which a relatively large torque is applied to a pinion shaft, has such a defect that a necessary pressing force can not be obtained and an abnormal sound such as a rattle sound is generated from the periphery of the engagement surface of the pinion teeth 86a and the rack teeth 81a.

In the electric power steering apparatus, in general, a rotation shaft of a steering wheel is connected to a pinion shaft of a rack and pinion movement converting mechanism through a joint. The electric power steering apparatus includes a column type power steering apparatus in which a motor and a speed reduction mechanism of the motor are positioned nearer to a steering wheel side than the joint, and a pinion type electric power steering apparatus in which a motor and a speed reduction mechanism of the motor is positioned nearer to a rack and pinion mechanism side than the joint.

When the output of an electric power steering apparatus is increased, there occurs a problem that the size of a motor is limited due to a layout and the like, and the output of the motor is also limited. In order to solve the above problem, there is proposed a method in which the efficiency of a mechanical system, especially a rack and pinion movement converting mechanism is raised to effectively use the efficiency of the motor. As this method, in the rack and pinion movement converting mechanism, a technique (hereinafter referred to as a "rolling type rack and pinion movement converting mechanism") using a rotatable roller as a pressure pad portion to press a rack shaft against a pinion shaft has been devised. According to the rolling type rack and pinion movement converting mechanism, in the case where a significant load is applied between the rack shaft and the pinion shaft, the mechanical efficiency can be greatly improved.

However, in the case where the rolling type rack and pinion movement converting mechanism is combined with the column type electric power steering apparatus or the pinion type electric power steering apparatus, since a motor does not respond to a kickback from a road surface, as compared with another conventional electric power steering apparatus, an excessive load is applied to the rack and pinion mechanism.

Further, in this case, since attenuation of a kickback force is inferior to a conventional sliding system since the rolling occurs on the sliding surface, there is a problem that a rattle sound is apt to be generated.

Furthermore, in this case, another object of introducing the rolling type rack and pinion movement converting mechanism is to improve a wheel returning property and an on-center feeling by reduction of a frictional force. However, since an influence of a frictional force of a motor is greater than an improvement by the rolling type rack and pinion movement converting mechanism, there is a problem that an effect has not been obtained to such a degree that the object is achieved.

SUMMARY OF THE INVENTION

The present invention has been made in view of the foregoing circumstances, and an object of the present invention is to provide an electric power steering apparatus which can prevent an excessive load from being generated in a rack and pinion movement converting mechanism, can suppress generation of a rattle sound, and can lessen an influence of frictional force of a motor.

The present invention relates to an electric power steering apparatus comprising a rack and pinion movement converting mechanism for converting rotation movement of a steering wheel into linear movement by engagement between a pinion shaft and a rack shaft, and a motor for assisting a driver's steering force to the steering wheel, and the rack and pinion movement converting mechanism is a rolling type rack and pinion movement converting mechanism, and an elastic body is inserted in a mechanism passage from the pinion shaft to an output shaft of the motor, so that the object of the present invention is achieved.

Moreover, the electric power steering apparatus comprises a joint for coupling a rotation shaft of the steering wheel to the pinion shaft of the rack and pinion movement converting mechanism, and is such a column type power steering apparatus that the motor and a speed reduction mechanism of the motor are disposed between the joint and the steering wheel, so that the object of the present invention is effectively achieved.

Moreover, the electric power steering apparatus comprises a joint for coupling a rotation shaft of the steering wheel to the pinion shaft of the rack and pinion movement converting mechanism, and is such a pinion type power steering apparatus that the motor and a speed reduction mechanism of the motor are disposed between the joint and the pinion shaft of the rack and pinion movement converting mechanism, so that the object of the present invention is effectively achieved.

Moreover, the elastic body is inserted in the mechanism passage from the output shaft of the motor to a speed reduction mechanism of the motor, so that the object of the present invention is effectively achieved.

Further, the elastic body is inserted in a mechanism of the joint, so that the object of the present invention is more effectively achieved.

Still further, the electric power steering apparatus comprises control means for controlling the motor on the basis of a steering assist instruction value calculated by arithmetic means based on a steering torque generated at a rotation shaft of the steering wheel and a current control value calculated from a current value of the motor, and auxiliary arithmetic means for obtaining a differential value of a signal of the steering torque and adding the value to the steering assist instruction value, so that the object of the present invention is effectively achieved.

DETAILED DESCRIPTION OF THE INVENTION

The mode of carrying the present invention will be described below.

Figure 2:
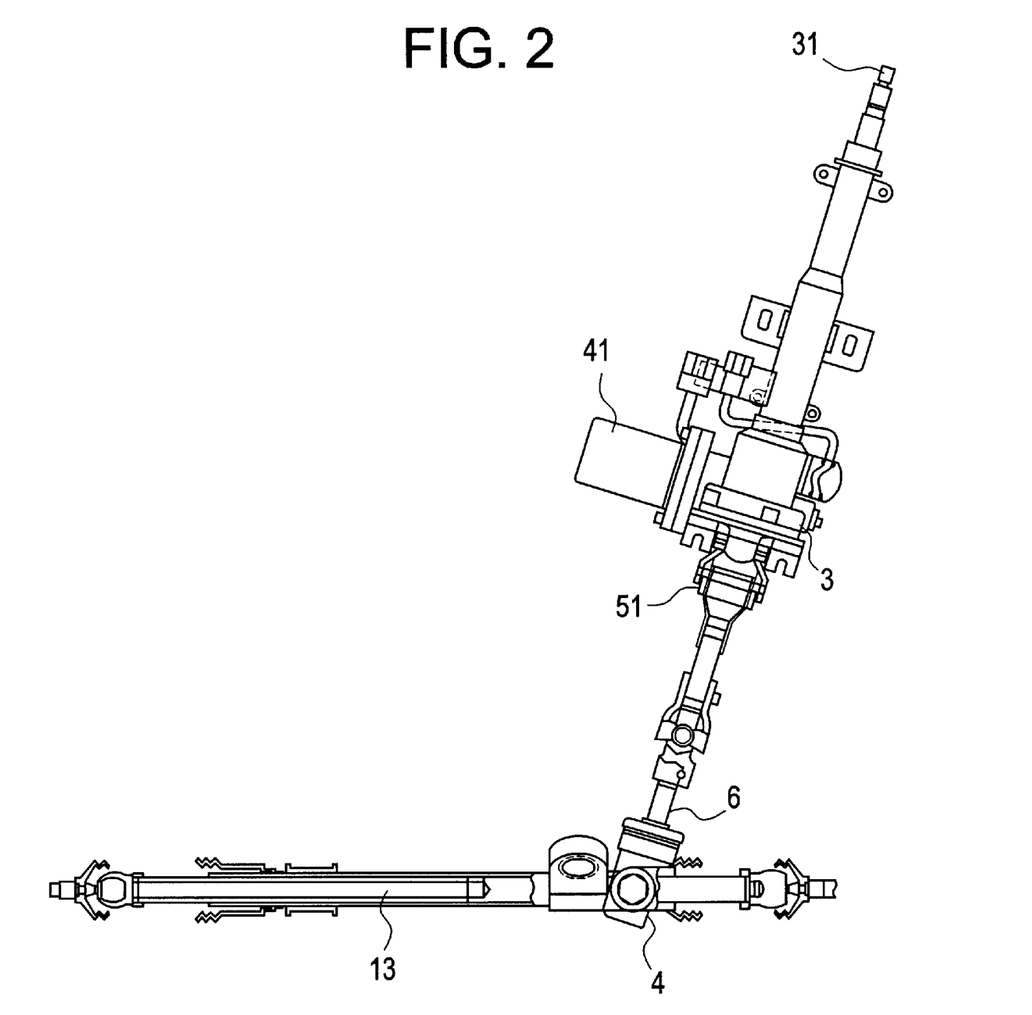
FIG. 2 is a front view showing a column type electric power steering apparatus of another embodiment of the present invention.
Figure 3:
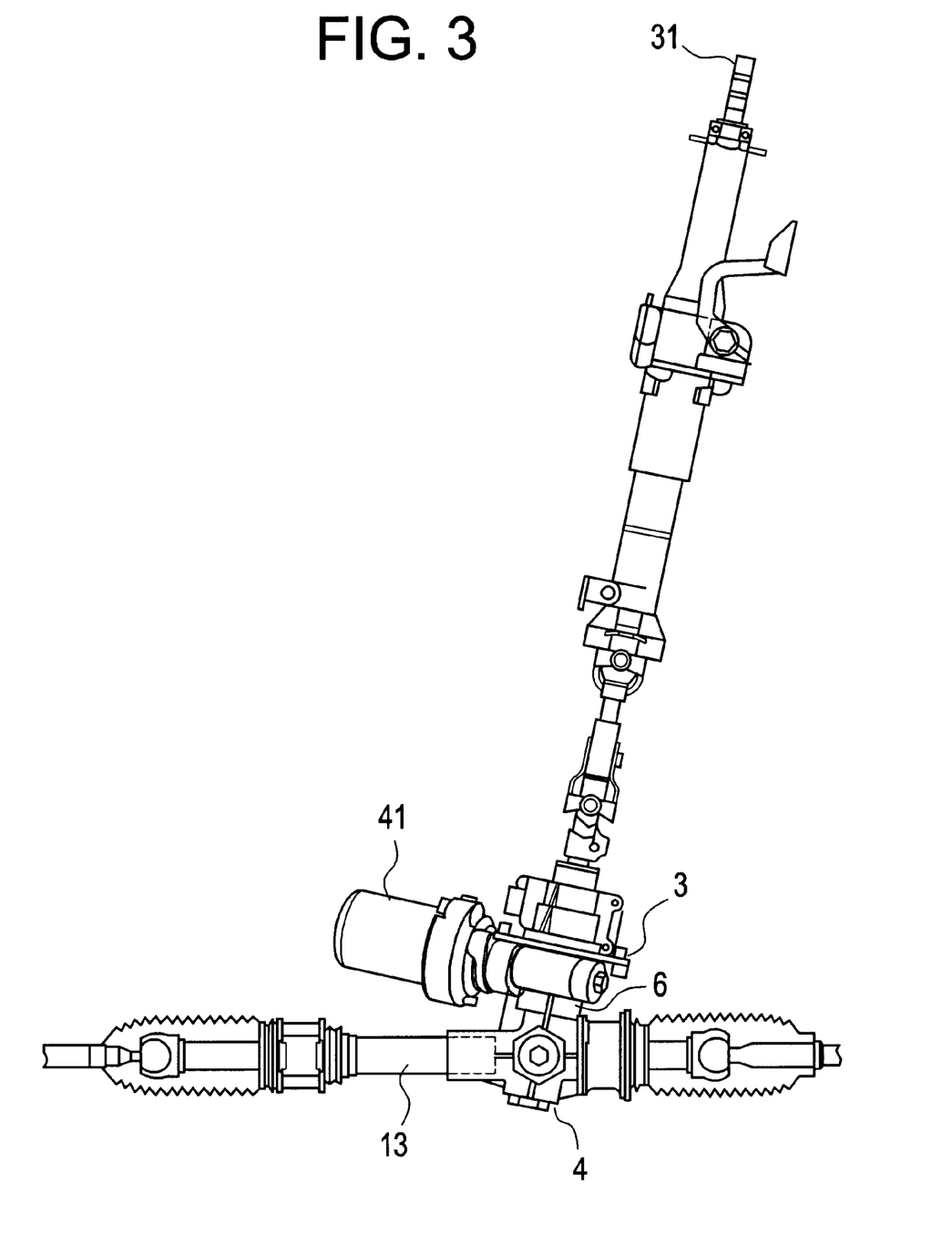
FIG. 3 is a front view showing a pinion type electric power steering apparatus of another embodiment of the present invention.

According to the present invention, in the case where a column type electric power steering apparatus as shown in FIG. 2 or a rolling type rack and pinion movement converting mechanism 4 as shown in FIG. 3 is used, since an elastic body with damping property is inserted in a passage from a pinion shaft 6 of the rack and pinion movement converting mechanism 4 to a motor 41 which becomes a driving source of power steering, the pinion shaft 6 can move relatively to the motor 41. Thus, it is possible to prevent an excessive load from being generated in the rolling type rack and pinion movement converting mechanism 4.

In both types of the column type electric power steering apparatus as shown in FIG. 2 and the pinion type electric power steering apparatus as shown in FIG. 3, by inserting the elastic body with damping property between the motor 41 and a worm wheel 3 as a speed reduction of the motor 41 mechanism, the effect of the present invention can be obtained. In the column type electric power steering apparatus as shown in FIG. 2, by inserting the elastic body with damping property to a joint 51 disposed between a rotation shaft of the worm wheel 3 and the pinion shaft 6 of the rolling type rack and pinion movement converting mechanism 4, the effect of the present invention can be obtained.

Moreover, according to the present invention, an insufficiency of attenuating action of a kickback force of the rolling type rack and pinion movement converting mechanism 4 is compensated by attenuating action of the elastic body with damping property, so that generation of a rattle sound can be prevented.

Further, according to the present invention, the elastic body with damping property is made to intervene between the motor 41 and the speed reduction mechanism of the motor 41, so that relative rotation of a steering wheel shaft coupling the rotation shaft of the motor 41 to the pinion shaft 6 is made possible in an elastic region of the elastic body. Thus, for example, even in the state where the motor 41 is stopped by a frictional force, the steering wheel 31 is interlocked with the pinion shaft 6 and becomes rotatable. Accordingly, influence of the frictional force of the motor 41 can be reduced, and it is possible to effectively use the effect of a technique of combination of the rolling type rack and pinion movement converting mechanism 4 and the column type electric power steering apparatus or the pinion type electric power steering apparatus.

Still further, the present invention has the following effect. In friction compensation control using a torque sensor signal, according to a conventional structure, road surface information is blocked by the rack and pinion movement converting mechanism 4 or the motor 41, so that the road surface information is not transmitted to a torque sensor and the effect of the friction compensation control can not be obtained. On the other hand, according to the structure of the present invention, since the road surface information is transmitted to the torque sensor, it becomes possible to compensate the friction of the motor by the friction compensation control using the torque sensor signal, and it is possible to effectively suppress generation of a rattle sound due to excessive operation of the motor.

Hereinafter, preferred embodiments of the invention will be described in detail with reference to the drawings.

Figure 4:
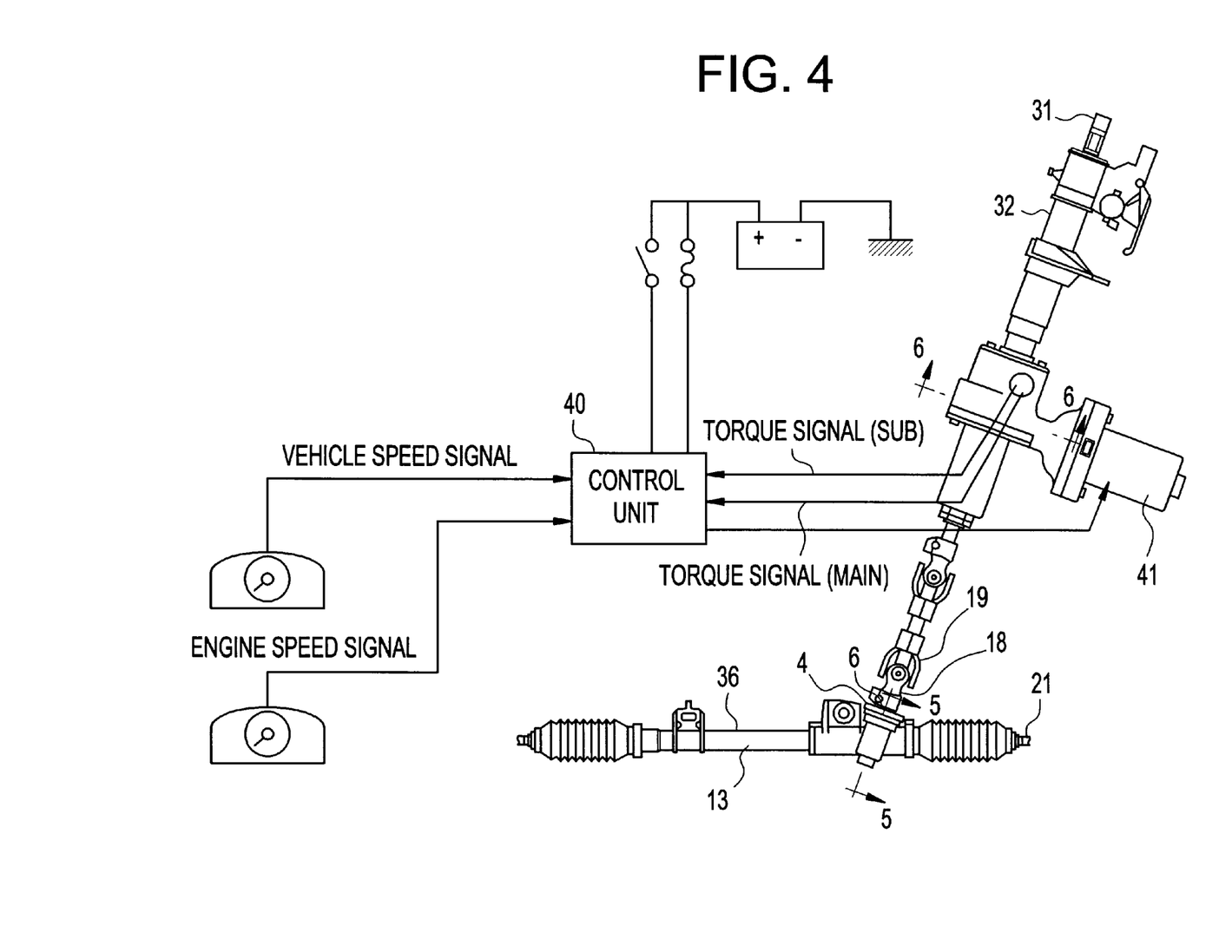
FIG. 4 is a front view showing a main portion of a front wheel steering mechanism including an electric power steering apparatus of an embodiment of the present invention.

FIG. 4 is a front view showing a main portion of a front wheel steering mechanism including an electric power steering apparatus of an embodiment of the present invention.

In FIG. 4, a steering wheel shaft 31 is fixed at a predetermined position in the inside of a vehicle compartment and in a slanted state such that its lower portion is positioned forward, and is supported in a cylindrical housing 32 rotatably around an axial core. A steering wheel (not shown) is fixed to an upper end portion of the steering wheel shaft 31 protruding by a predetermined length from an upper portion of the housing 32.

A rack and pinion movement converting mechanism 4 is made up of, a longitudinal direction being made a right-and-left direction of a vehicle, a cylindrical rack shaft case 36 provided almost horizontally in an engine room at a front portion of the vehicle, a rack shaft 13 inserted in the rack shaft case 36 while its axial core is made roughly coincident with this and is movable in an axial length direction, a pinion shaft 6 supported in the inside of the rack shaft case 36 obliquely to the axial core of the rack shaft 13 and engaged with the rack shaft 13, and the like.

Figure 5:
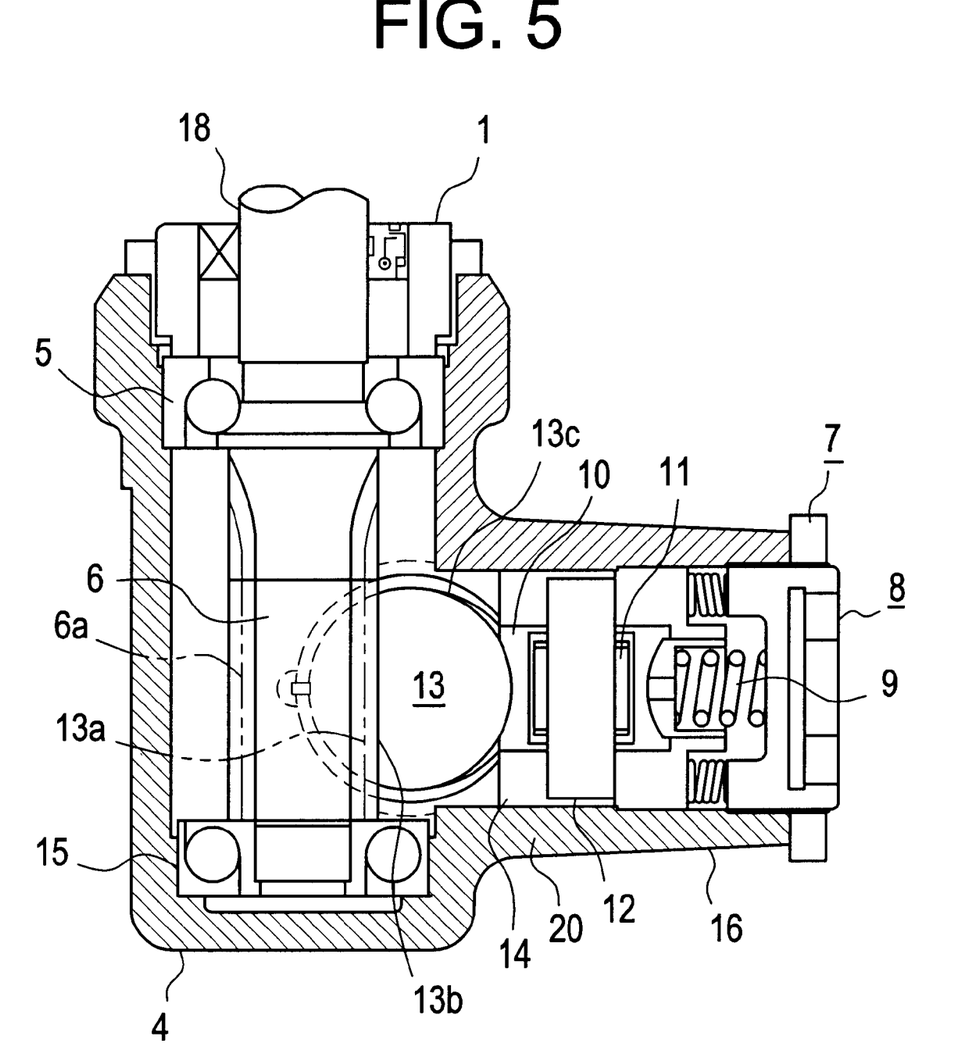
FIG. 5 is a sectional view showing a rolling type rack and pinion movement converting mechanism in the electric power steering apparatus of the embodiment of the present invention.

FIG. 5 is a sectional view showing a rolling type rack and pinion movement converting mechanism in the electric power steering apparatus of the embodiment of the invention.

In FIG. 5, an upper portion is an input shaft 18 in which rotation of the steering wheel is transmitted from the side of the steering wheel shaft 31 through a universal joint 19 (refer to FIG. 4), and the pinion shaft 6 is coaxially attached to a lower portion of the input shaft 18 in a rotatable manner. A torque sensor portion 1 is disposed at the input shaft 18, and has a function to detect a load of a steering system to transmit a torque signal to an ECU (electric control unit, not shown).

When a current calculated on the basis of a vehicle speed signal and the torque signal and outputted from the ECU is applied, an electric motor (not shown) is rotated, and its rotation is transmitted to a worm 2. The worm 2 is disposed coaxially with the electric motor for assisting a steering force. Further, a rotating force of the worm 2 is reduced by a worm wheel 3 (refer to FIG. 6) fitted on the input shaft 18 to increase a torque so that rotation movement of the pinion shaft 6 is assisted.

The pinion shaft 6 is supported in the inside of a gear box through bearings 5 and 15. Pinion teeth 6a are formed on the outer periphery of the pinion shaft 6, rack teeth 13a of the rack shaft 13 as an operating mechanism are engaged with the pinion teeth 6a, the rack shaft 13 is displaced in the axial length direction (front and back direction of FIG. 5), and a desired steering angle is finally given to the steering wheel (not shown) through a tie rod 21 (refer to FIG. 4).

A part of the end portion of the rack shaft 13 is semi-cylindrical in section, and the rack teeth 13a are engraved in a flat portion 13b in the axial direction of the rack shaft 13. The rack teeth 13a and the pinion teeth 6a are engaged with one another so that the rotation movement of the pinion shaft 6 is converted into the linear movement of the rack shaft 13. In order to keep the engagement relation, a pressure pad portion 20 exerts a pressing force on an engagement portion through the rack shaft 13. A mechanism for exerting the pressing force on the engagement portion is provided in an almost cylindrical housing 16 protruding from the gear box 4 in the direction orthogonal to the axial direction of the pinion shaft 6.

The pressure pad portion 20 includes a roller 10, a needle bearing 11, a pin shaft 12, and a bearing holder 14, and presses the rack shaft 13 to the pinion shaft 6 by a predetermined pressing force so that the engagement between the pinion teeth 6a and the rack teeth 13a is kept.

The pressure pad portion 20 is structured such that the pin shaft 12 is positioned at a predetermined place by the bearing holder 14, and the roller 10 becomes rotatable around the pin shaft 12 as the rack shaft 13 moves in the axial direction. In this embodiment, only the roller 10 slides on an outer peripheral surface 13c of the rack shaft 13. That is, such a structure is made that the roller 10 rolls on the rack shaft 13.

In the state where the pressure pad portion 20 is housed in the inside of the housing portion 16, the pressure pad portion 20 constituted by the bearing holder 14, the pin shaft 12, the needle bearing 11, and the roller 10 can move in one united body in the housing 16 in the axial direction.

Further, a coil spring 9 as an elastic member is disposed in the pressure pad portion 20 at a side opposite to the rack shaft 13. One end of the coil spring 9 positioned to exert a pressing force on the pressure pad portion 20, abuts on the pressure pad portion 20 (surface of the bearing holder 14), and the other end abuts on an adjust screw 8 engaged with the end of the housing 16 by a lock nut 7.

Thus, by adjusting the adjust screw 8 and moving it in the axial direction, it is possible to adjust a pressing force exerted on the pressure pad portion 20 by the coil spring 9 extending in the inside of the housing 16.

According to such a rolling type rack and pinion movement converting mechanism, in the case where a significant load is applied between the rack shaft and the pinion shaft, the mechanical efficiency can be greatly improved.

Figure 6:
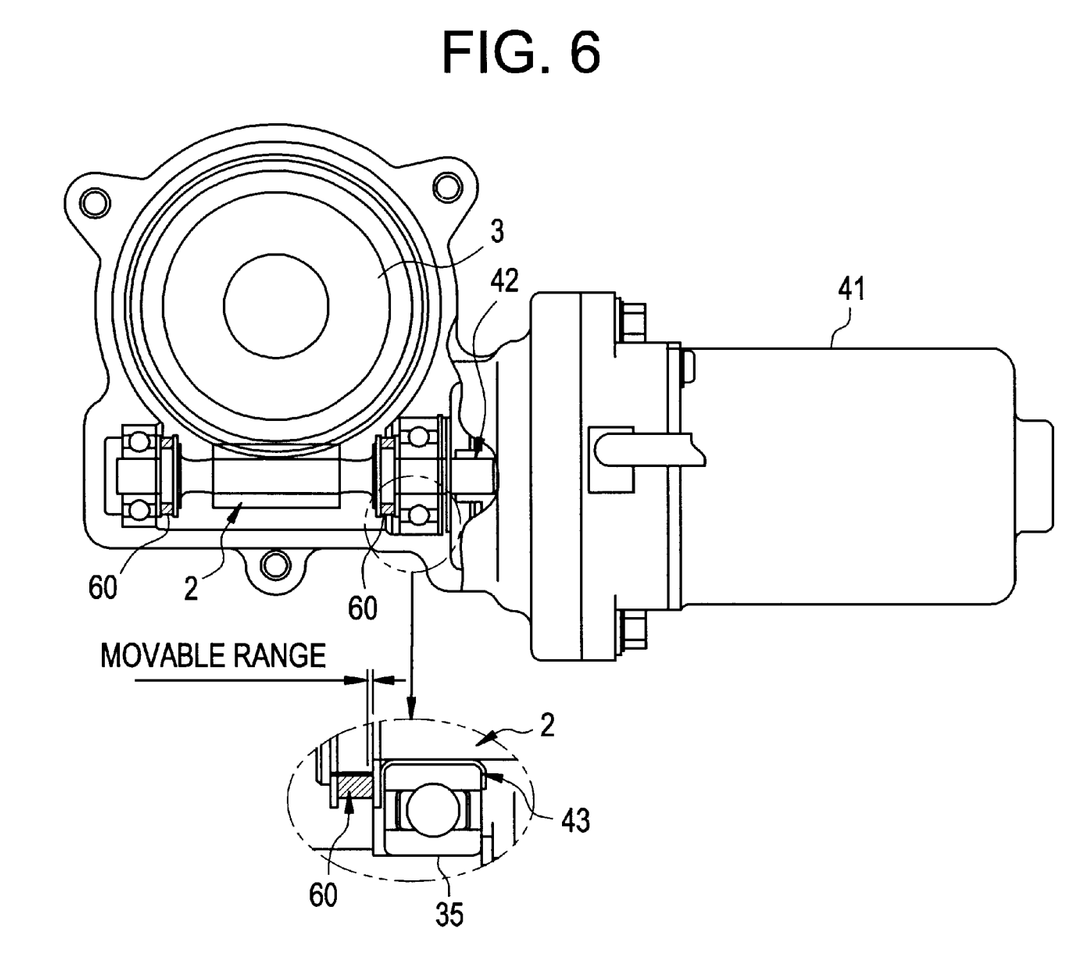
FIG. 6 is a partial sectional view showing a motor which becomes a driving source of power steering in the electric power steering apparatus of the embodiment of the present invention, and a speed reduction mechanism of the motor.

FIG. 6 is a partial sectional view showing a motor as a driving source of power steering in the electric power steering apparatus of the embodiment of the present invention, and a speed reduction mechanism of the motor. The feature of this embodiment is that a rubber 60 as an elastic body is disposed between a worm bearing 35 and both end portions of the worm 2 so that the worm 2 in the speed reduction mechanism of the motor 41 becomes movable in the worm shaft direction.

In an elastic region (movable range) of the rubber 60, rotation of the worm wheel 3 becomes a displacement in the axial direction of the worm until a torque generated at the worm 2 overcomes a frictional force of the motor 41 and inertia, and the rotation of the motor 41 and the rotation of the worm wheel 3 coupled to the pinion shaft 6 are not coupled to each other. That is, such a structure is adopted that in the case where the worm wheel 3 receives a kickback from a road surface, the worm 2 is made to slide and the shock of the kickback is absorbed by the rubber 60.

According to such a structure, in the movable range of the worm 2 by the rubber 60, since the kickback force can be released in the rotation direction of the pinion shaft 6 without converging the kickback force to the motor 41, it is possible to prevent a load from concentrating at the rack and pinion mechanism. Besides, according to such a structure, since the vibration controlling function of the rubber 60 compensates an insufficiency of vibration controlling function which is a defect of the rolling type rack and pinion movement converting mechanism, it is possible to prevent generation of a rattle sound.

Figure 7:
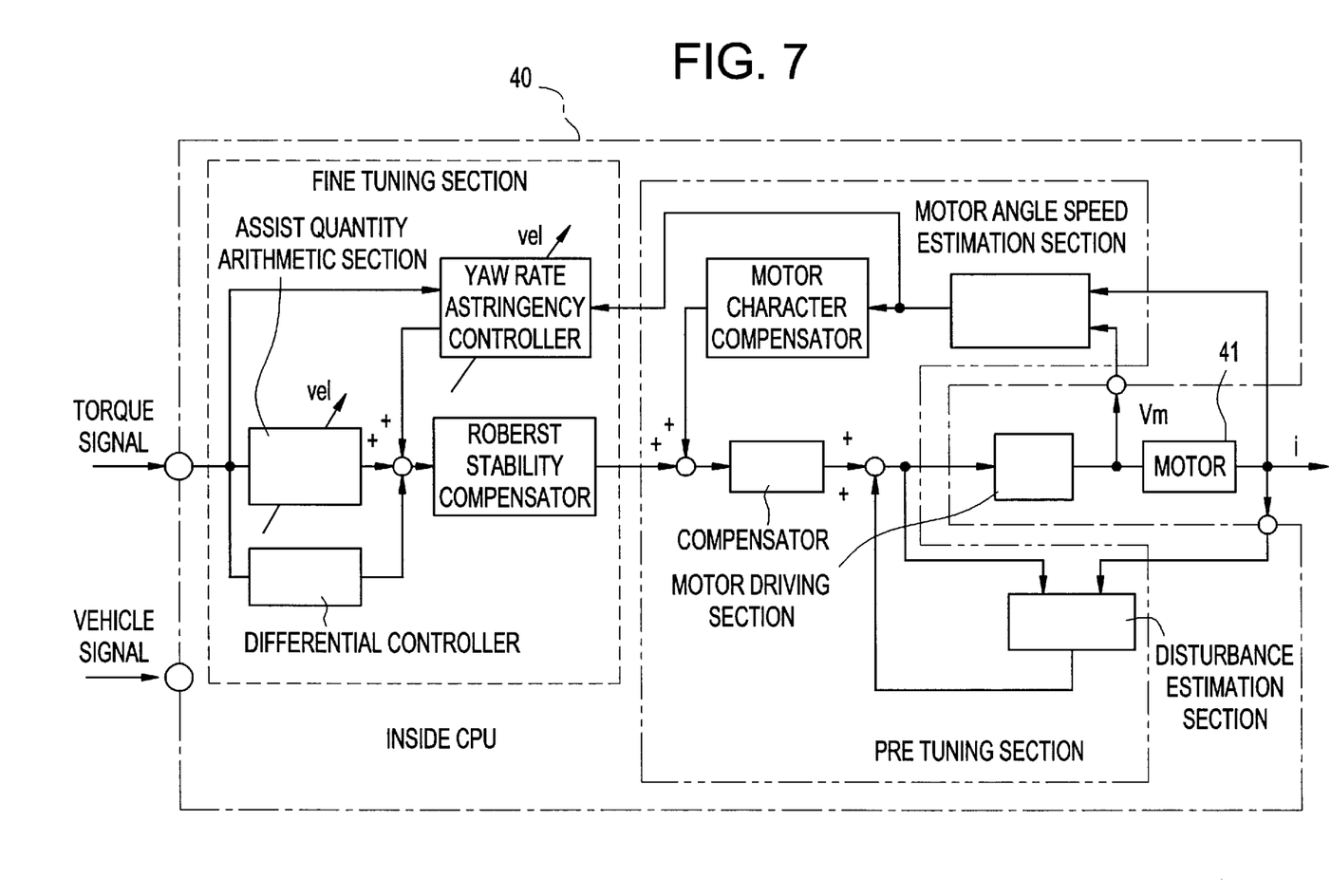
FIG. 7 is a block diagram showing a control unit for performing friction compensation control of a motor in an electric power steering apparatus of another embodiment of the present invention.

FIG. 7 is a block diagram showing a control unit 40 for performing friction compensation control of a motor in an electric power steering apparatus according to another embodiment of the present invention.

For the purpose of improving response of an assist torque and improving stability of a torque control system, the control unit 40 adds a value in proportion to a differential of a steering torque signal to an assist amount (steering assist instruction value) to raise the response of the control system. Like this, a signal obtained by differentiating a torque amount is added to the assist amount. A negative gain at the time when the steering torque is large and a wheel is returned, that is, at the time when a steering angle θ is decreased, is applied, so that an abrupt decrease of the assist amount (steering assist instruction value) is prevented, and as a result, large hysteresis characteristics in a high torque range and small hysteresis characteristics in a low torque range in the vicinity of a neutral point are given.

That is, the control unit 40 performs friction compensation control based on a torque signal Tr as a torque detection value for the purpose of compensating an influence of friction of the motor 41. The friction compensation control speeds up the response of torque control in the vicinity of the center where the steering torque is small, and operates in the direction where distortion of a torsion bar detecting a steering torque is suppressed to a small value. On the other hand, friction of the motor 41 operates in the direction where distortion of the torsion bar is increased. Thus, if the friction of the motor 41 is detected as the distortion of the torsion bar, it becomes possible to make friction compensation by the friction compensation control with the control unit 40.

However, since the torsion bar is disposed nearer to the wheel side than the motor 41, although friction compensation can be made against input from the wheel side, compensation is difficult against input from the road surface, such as kickback. Thus, it has not been possible to reduce the rattle sound of the rack and pinion movement converting mechanism 4 by the friction compensation control.

On the other hand, in the elastic region of the rubber 60 of the elastic body as shown in FIG. 6, input from the road surface can be detected by the torque sensor, so that the friction compensation control becomes effective also for the input from the road surface. When the friction compensation control is performed once by the control unit 40, the friction of the motor 41 is compensated, and it becomes possible to detect the input from the road surface by the torque sensor. That is, it becomes possible to release the kickback force exceeding the elastic region of the rubber 60 from the rack and pinion movement converting mechanism 4 to the wheel side by the rubber 60 and the friction compensation control. Further, by tuning the friction compensation control with the control unit 40, it becomes possible to perform such tuning as to suppress the rattle sound of the rack and pinion movement converting mechanism 4 and to suitably transmit information of the road surface to the steering wheel.

Even if the rubber 60 of the elastic body as shown in FIG. 6 is disposed at any position between the speed reduction mechanism of the motor 41 and the mechanism to produce friction or inertia of the motor 41, it is possible to obtain an effect of preventing an excessive load from being generated at the foregoing rolling type rack and pinion movement converting mechanism, an effect of compensating an insufficiency of attenuating action of kickback force of the rolling type rack and pinion movement converting mechanism and preventing generation of a rattle sound, and an effect of reducing the influence of friction force of the motor.

Figure 8:
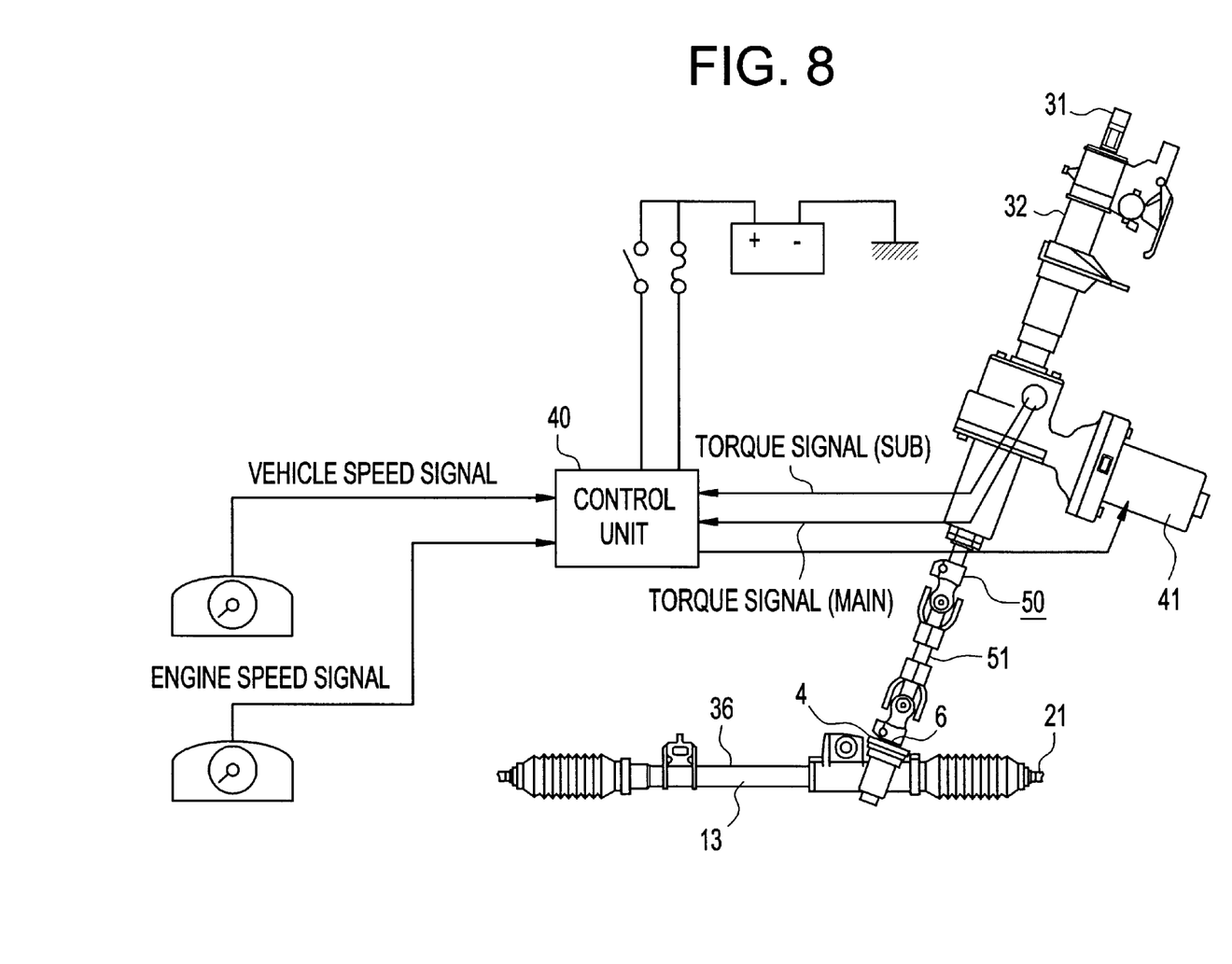
FIG. 8 is a front view showing a main portion of a front wheel steering mechanism including an electric power steering apparatus of another embodiment of the present invention.

FIG. 8 is a front view showing a main portion of a front wheel steering mechanism including an electric power steering apparatus according to another embodiment of the present invention. In this embodiment, a rubber 60 of an elastic body (as shown in FIG. 6) is disposed at a joint 51 for coupling a pinion shaft 6 of a rack and pinion movement converting mechanism 4 to an output shaft 50 of a speed reduction mechanism of a motor 41.

As described above, according to the present invention, in an electric power steering apparatus using a rolling type rack and pinion movement converting mechanism, since an elastic body is inserted in a passage from a pinion shaft of the rolling type rack and pinion movement converting mechanism to an output shaft of a motor, it is possible to provide the electric power steering apparatus in which generation of an excessive load in the rolling type rack and pinion movement converting mechanism can be prevented, generation of a rattle sound can be suppressed, and influence of a friction force of the motor can be reduced.

What is claimed is:

1. An electric power steering apparatus, comprising:

arithmetic means for calculating a steering assist instruction value based on a steering torque generated at a rotation shaft of the steering wheel and a current control value from a current value of the motor;

control means for controlling the motor on the basis of the steering assist instruction value and the current control value; and auxiliary arithmetic means for obtaining a differential value of a signal of the steering torque and adding the value to the steering assist instruction value, and further having a rack and pinion movement converting mechanism for converting rotation movement of a steering wheel into linear movement by engagement between a pinion shaft and a rack shaft; and a motor for assisting a driver's steering force to the steering wheel, and wherein:

said rack and pinion movement converting mechanism is a rolling type rack and pinion movement converting mechanism; and an elastic body is disposed in a mechanism passage from said pinion shaft to an output shaft of said motor.

2. An electric power steering apparatus according to claim 1, further comprising a joint for coupling a rotation shaft of the steering wheel to the pinion shaft of the rack and pinion movement converting mechanism, wherein the apparatus is a column type power steering apparatus in which the motor and a speed reduction mechanism of the motor are disposed between the joint and the steering wheel.

3. An electric power steering apparatus according to claim 1, further comprising a joint for coupling a rotation shaft of the steering wheel to the pinion shaft of the rack and pinion movement converting mechanism, wherein the apparatus is a pinion type power steering apparatus in which the motor and a speed reduction mechanism of the motor are disposed between the joint and the pinion shaft of the rack and pinion movement converting mechanism.

4. An electric power steering apparatus according to claim 1, wherein the elastic body is disposed in the mechanism passage from the output shaft of the motor to a speed reduction mechanism of the motor.

5. An electric power steering apparatus according to claim 2, wherein the elastic body is disposed in a mechanism of the joint.

6. An electric power steering apparatus, comprising:

a rack and pinion movement converting mechanism operable to convert a rotation movement of a steering wheel into linear movement by an engagement between a pinion shaft and a rack shaft;

a motor operable to assist a steering force asserted on the steering wheel; and an elastic body disposed in a mechanism passage from said pinion shaft to an output shaft of said motor.

7. An electric power steering apparatus as set forth in claim 6, wherein the elastic body is made of rubber.

8. An electric power steering apparatus according to claim 1, further comprising:

arithmetic means for calculating a steering assist instruction value based on a steering torque generated at a rotation shaft of the steering wheel and a current control value from a current value of the motor.

9. An electric power steering apparatus according to claim 8, further comprising:

control means for controlling the motor on the basis of the steering assist instruction value and the current control value.

10. An electric power steering apparatus according to claim 8, further comprising:

auxiliary arithmetic means for obtaining a differential value of a signal of the steering torque and adding the differential value to the steering assist instruction value.

11. An electric power steering apparatus, comprising:

a motor for assisting a driver's steering force provided to a steering wheel;

arithmetic means for calculating a steering assist instruction value based on a steering torque generated at a rotation shaft of the steering wheel and a current control value derived from an electrical current value of the motor;

control means for controlling the motor on the basis of the steering assist instruction value and the current control value;

auxiliary arithmetic means for obtaining a differential value of the steering torque and adding the differential value to the steering assist instruction value;

a rack and pinion movement converting mechanism for converting rotation movement of the steering wheel into linear movement by engagement between a pinion shaft and a rack shaft; and an elastic body disposed in a mechanism passage from the output shaft of the motor to a speed reduction mechanism of the motor, wherein said rack and pinion movement converting mechanism is a rolling type rack and pinion movement converting mechanism.

* * * * *